US012062888B2

(12) United States Patent
Banno et al.

(10) Patent No.: US 12,062,888 B2
(45) Date of Patent: Aug. 13, 2024

(54) SPARK PLUG

(71) Applicant: Niterra Co., Ltd., Nagoya (JP)

(72) Inventors: Tomokazu Banno, Nagoya (JP); Mayu Fujisawa, Nagoya (JP)

(73) Assignee: NITERRA CO., LTD., Nagoya (JP)

( * ) Notice: Subject to any disclaimer, the term of this patent is extended or adjusted under 35 U.S.C. 154(b) by 0 days.

(21) Appl. No.: 18/404,294

(22) Filed: Jan. 4, 2024

(65) Prior Publication Data

US 2024/0243555 A1 Jul. 18, 2024

(30) Foreign Application Priority Data

Jan. 12, 2023 (JP) ................................ 2023-002903

(51) Int. Cl.

| | |
|---|---|
| ***H01T 13/20*** | (2006.01) |
| ***H01T 13/02*** | (2006.01) |
| ***H01T 13/32*** | (2006.01) |
| ***H01T 13/39*** | (2006.01) |

(52) U.S. Cl.

CPC ............ *H01T 13/32* (2013.01); *H01T 13/39* (2013.01)

(58) Field of Classification Search

CPC ................................ H01T 13/32; H01T 13/39

See application file for complete search history.

(56) References Cited

U.S. PATENT DOCUMENTS

2015/0357796 A1* 12/2015 Inoue ...................... H01T 21/02 219/78.15
2017/0338631 A1 11/2017 Benz et al.
2019/0334322 A1* 10/2019 Yagi ........................ H01T 13/39

FOREIGN PATENT DOCUMENTS

JP 2017-537444 A 12/2017

* cited by examiner

*Primary Examiner* — Tracie Y Green

(74) *Attorney, Agent, or Firm* — KUSNER & JAFFE

(57) ABSTRACT

A spark plug includes a base member containing a first component in the largest amount, a tip, and a fusion zone which is in contact with the tip and the base member and contains the first component and a second component. The ratio of the first component content of the fusion zone to the first component content of the base member is less than 0.93. The length of a portion of the tip surrounded by the fusion zone is 0.4 times or more of the distance between the discharge surface of the tip and the interface between the tip and the fusion zone.

8 Claims, 2 Drawing Sheets

SPARK PLUG

FIELD OF THE INVENTION

The present invention relates to a spark plug in which a tip is joined to a base member.

BACKGROUND OF THE INVENTION

For example, JP2017-537444A discloses a prior art technique relating to a spark plug in which a tip is joined to a surface of a base member through a fusion zone. In the prior art technique, the durability of the joint is secured by appropriately setting the angle of the interface between the tip and the fusion zone in relation to the surface of the base member.

The prior art technique still has room for improvement in terms of joint durability and erosion resistance of the tip.

The present invention has been accomplished in order to meet this request, and an object of the present invention is to provide a spark plug which can enhance the joint durability and erosion resistance of its tip.

SUMMARY OF THE INVENTION

In order to achieve this object, the present invention provides a spark plug comprising a first electrode, and a second electrode disposed with a gap formed between the first electrode and the second electrode. The first electrode includes a base member which contains a first component in the largest amount, a tip which contains a second component different from the first component in the largest amount, and a fusion zone which is in contact with the tip and the base member and contains the first component and the second component. The tip has a discharge surface and a side surface which is continuous with the discharge surface and which is intersected by a surface of the fusion zone.

The ratio X/Y of an amount of the first component in the fusion zone (X) to an amount of the first component in the base member (Y) is less than 0.93.

In a cross section perpendicular to the discharge surface, a first perpendicular line is assumed to extend to a first straight line containing the discharge surface from a first intersection between the side surface of the tip and the surface of the fusion zone, and a second straight line is assumed to extend perpendicularly to the first straight line and pass through a point on the first straight line, the point being 0.03 mm away from the first perpendicular line in a direction away from the surface of the fusion zone, the second straight line intersecting an interface between the tip and the fusion zone at a second intersection.

When the distance between the second intersection and the point is represented by C (mm) and the length of a second perpendicular line extending from the first intersection to a straight line passing through the second intersection and being parallel to the discharge surface is represented by B (mm), the ratio of the length B to the distance C is equal to or greater than 0.4.

The ratio X/Y is preferably equal to or less than 0.69.

The length A of the first perpendicular line may be greater than 0 mm and less than 0.2 mm.

The length A of the first perpendicular line is preferably greater than 0 mm and less than 0.12 mm.

The ratio of the length A of the first perpendicular line to the distance C may be less than 0.53.

The ratio of the length A of the first perpendicular line to the length B may be less than 0.89.

The first component may be Ni.

The second component may be Ir.

According to the present invention, the length B of the second perpendicular line, which extends from the first intersection between the side surface of the tip and the surface of the fusion zone to the straight line passing through the second intersection and being parallel to the discharge surface, is 0.4 times or more of the distance C between the discharge surface of the tip and the second intersection on the interface between the tip and the fusion zone. Since the length of a portion of the tip surrounded by the fusion zone can be secured, the erosion resistance of the tip can be enhanced. Moreover, since the ratio X/Y of the amount of the first component (the main component of the base member) in the fusion zone (X) to the amount of the first component in the base member (Y) is less than 0.93, thermal stress at the interface between the tip and the fusion zone can be reduced. Since generation of cracks at the interface can be restricted, the durability of joint can be enhanced.

DETAILED DESCRIPTION OF THE INVENTION

Figure 1:
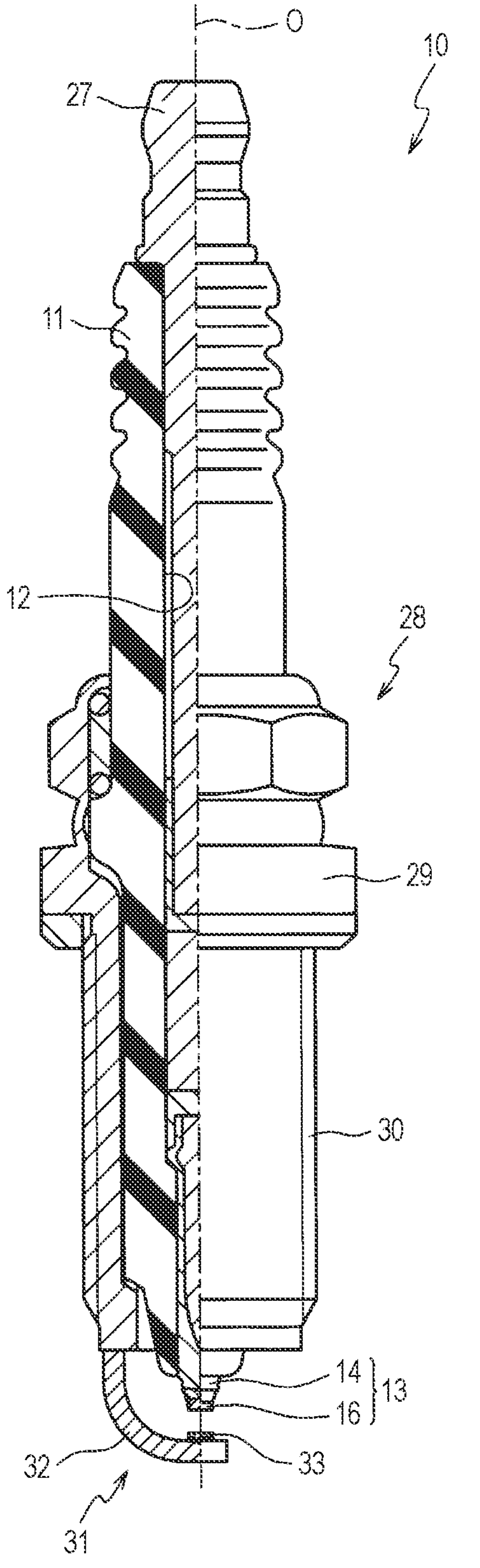
FIG. 1 is a one-side sectional view of a spark plug according to one embodiment.

A preferred embodiment of the present invention will now be described with reference to the attached drawings. FIG. 1 is a sectional view, on one side of an axial line O, of a spark plug 10 according to one embodiment. In FIG. 1, the lower side of the sheet will be referred to as the forward end side of the spark plug 10, and the upper side of the sheet will be referred to as the rear end side of the spark plug 10 (these definitions also apply to FIG. 2). As shown in FIG. 1, the spark plug 10 includes a first electrode and a second electrode which produce spark discharge. In the present embodiment, a center electrode 13 will be referred to as the first electrode, and a ground electrode 31 will be referred to as the second electrode.

The spark plug 10 includes an insulator 11. The insulator 11 is an approximately cylindrical member formed of a ceramic material, such as alumina, which is excellent in mechanical characteristics and insulating properties at high temperature. The insulator 11 has an axial hole 12 extending along the axial line O.

The center electrode 13 is a rod-shaped member disposed in the axial hole 12 of the insulator 11. The center electrode 13 is composed of a core member formed mainly of copper, and a base member 14 having the shape of a bottomed cylinder and covering the core member. The core member may be omitted. The base member 14 has a chemical composition in which a first component has the largest proportion. Examples of the first component include Ni, Co, and Fe. In the present embodiment, the first component is Ni. However, the first component is not limited to Ni. The first component content of the base member 14 is preferably 50% by mass or more, more preferably 55% by mass or more, further preferably 60% by mass or more, particularly preferably 70% by mass or more.

Figure 2:
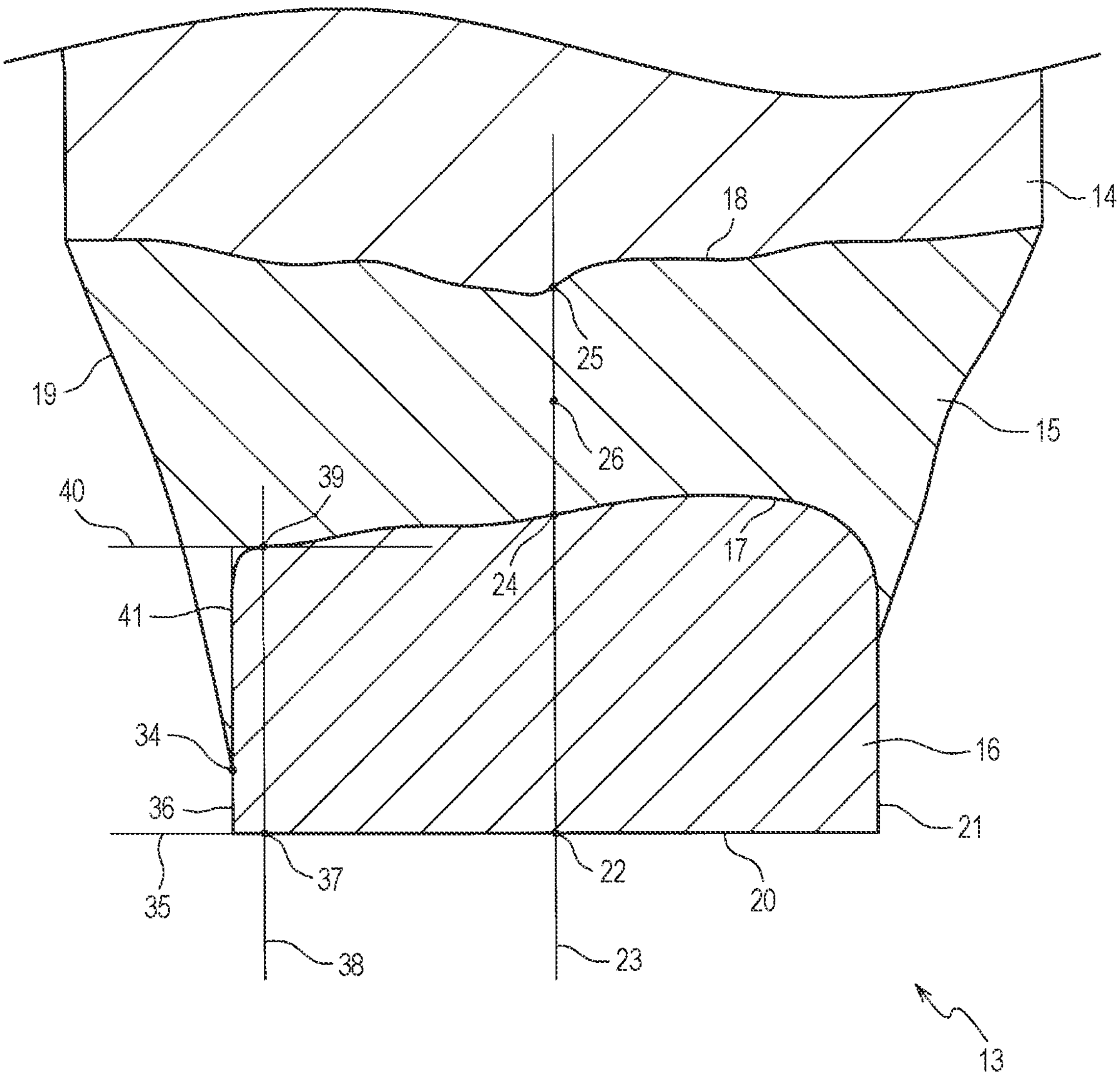
FIG. 2 is a sectional view of a center electrode.

FIG. 2 is a sectional view of a forward end of the center electrode 13 and its vicinity in which a rear end side portion of the center electrode 13 is omitted. A tip 16 is joined to a forward end of the base member 14 through a fusion zone 15. The fusion zone 15 is formed by laser welding, which is performed by applying a laser beam to the boundary between the base member 14 and the tip 16 whose bottom surface is in contact with the base member 14. The fusion zone 15 is formed as a result of fusion of the base member 14 and the tip 16. The fusion zone 15 has an interface 17 between the tip 16 and the fusion zone 15, an interface 18 between the base member 14 and the fusion zone 15, and a surface 19 of the fusion zone 15 which connects the base member 14 and the tip 16 together.

The tip 16 protrudes toward the forward end side from a forward end of the insulator 11. The tip 16 has a chemical composition in which a second component, which differs from the first component, has the largest proportion. An example of the second component is one selected from noble metals such as Pt, Rh, Ir, and Ru. In the present embodiment, the second component is Ir. However, the second component is not limited to Ir. The second component content of the tip 16 is preferably 50% by mass or more.

The ratio X/Y of the amount (% by mass) of the first component in the fusion zone 15 to the amount (% by mass) of the first component in the base member 14 is affected by the proportion of the first component in the base member 14 and the proportion, to the entire base member 14, of its portion fused to form the fusion zone 15. The proportion of the portion of the base member 14 fused to form the fusion zone 15 can be set by, for example, setting the position and angle of application of a laser beam for laser welding and the intensity of the laser beam.

The ratio X/Y is less than 0.93. More preferably, the ratio X/Y is 0.69 or less. The purpose of setting the ratio X/Y to be less than 0.93, more preferably 0.69 or less is to reduce the difference in coefficient of linear thermal expansion between the fusion zone 15 containing the first component and the tip 16 containing the second component, thereby reducing thermal stress at the interface 17 between the tip 16 and the fusion zone 15. The proportion of the first component in the fusion zone 15 is preferably 20% by mass or greater. The purpose of setting the proportion of the first component to 20% by mass or greater is to secure the amount of the base member 14 fused to form the fusion zone 15, thereby securing the mechanical strength of the interface 18 between the base member 14 and the fusion zone 15.

The tip 16 has a discharge surface 20 and a side surface 21 connected to the discharge surface 20. In the present embodiment, the discharge surface 20 has the shape of a circle whose center is located at the centroid 22 of the discharge surface 20. The centroid 22 is a geometric center of the discharge surface 20 when considered as a plane figure. The geometric center is calculated by well-known means. The side surface 21 of the tip 16 is a cylindrical surface whose diameter is constant over the enter length in the axial direction. The discharge surface 20 of the tip 16 faces toward a ground electrode 31 (see FIG. 1).

The first component content (% by mass) of the fusion zone 15 is determined through analysis under a scanning electron microscope (SEM-EDS) equipped with an energy-dispersive X-ray spectrometer and applying an electron beam to a specimen. The position at which an electron beam is applied to the specimen so as to detect components of the fusion zone 15 is a midpoint 26 of a line segment obtained by cutting, at the interfaces 17 and 18, a straight line 23 which extends through the centroid 22 and is perpendicular to the discharge surface 20 (a line segment whose opposite ends are located at intersections 24 and 25).

The first component content (% by mass) of the base member 14 is also determined under an SEM-EDS. The position at which an electron beam is applied to the specimen so as to detect components of the base member 14 is a point which is located within the base member 14 and on the straight line 23. The point is shifted toward the interior of the base member 14 from the intersection 25 by an amount corresponding to the distance between the intersection 25 and the midpoint 26.

Referring back to FIG. 1, the center electrode 13 is electrically connected to a metallic terminal member 27 within the axial hole 12. The metallic terminal member 27 is a rod-shaped member to which a high-voltage cable (not shown) is connected, and is formed of a metallic material having electrical conductivity (for example, low carbon steel or the like). The metallic terminal member 27 is fixed on the rear end side of the insulator 11 in a state in which a forward end portion of the metallic terminal member 27 is inserted into the axial hole 12.

A metallic shell 28 is fixed to a periphery of the insulator 11. The metallic shell 28 is a member which has an approximately cylindrical shape and is formed of a metallic material having electrical conductivity (for example, low carbon steel or the like). The metallic shell 28 has a bearing portion 29 which bulges radially outward and has a flange-like shape, and a thread portion 30 provided on an outer circumferential surface of a portion of the metallic shell 28 located on the forward end side of the bearing portion 29. The metallic shell 28 is fixed by screwing the thread portion 30 into a threaded hole (not shown) of an engine (cylinder head). The ground electrode 31 is connected to a forward end portion of the metallic shell 28.

The ground electrode 31 is a rod-shaped member formed of a metallic material having electrical conductivity. The ground electrode 31 has a rod-shaped base member 32 whose end portion is joined to the metallic shell 28, and a tip 33 connected to the base member 32 through a fusion zone. The base member 32 has a chemical composition containing Ni in an amount of 50% by mass or greater. The tip 33 has a chemical composition containing one or more selected from noble metals such as Pt, Rh, Ir, and Ru in an amount of 50% by mass or greater.

FIG. 2 is a sectional view of the center electrode 13 which passes through the centroid 22 of the discharge surface 20 of the tip 16 and is perpendicular to the discharge surface 20. Junction between the base member 14 and the tip 16 will be described with reference to FIG. 2. The length of a first perpendicular line 36 extending from a first intersection 34, at which the side surface 21 of the tip 16 and the surface 19 of the fusion zone 15 intersect each other, to a first straight line 35 containing the discharge surface 20 is represented by A (mm).

Since two first intersections 34, at which the side surface 21 of the tip 16 and the surface 19 of the fusion zone 15 intersect each other, appear in the sectional view as shown in FIG. 2, there exist two first perpendicular lines 36 extending from the first intersections 34 to the first straight line 35. The length of a shorter one of the two perpendicular lines 36 is used as the length A. The case where the length A is 0 mm is excluded because of the following reason. If the case where the length A is 0 mm is not excluded, there exists the case where a corner of the discharge surface 20, at which field intensity is strong and discharge occurs easily, is covered by the fusion zone 15, and a portion of the fusion zone 15 near the corner of the discharge surface 20 becomes more likely to be eroded by spark.

A point 37 on the first straight line 35 is located 0.03 mm away from the first perpendicular line 36 in a direction away from the surface 19 of the fusion zone 15, which surface contains the first intersection 34. The distance between the point 37 and a second intersection 39, at which a second straight line 38 extending perpendicularly to the first straight line 35 and passing through the point 37 intersects the interface 17 between the tip 16 and the fusion zone 15, is represented by C (mm). The distance C is the length of a line segment obtained by cutting the second straight line 38 at the first straight line 35 and the interface 17. The second straight line 38 is parallel to the first perpendicular line 36.

The reason why the distance between the first perpendicular line 36 and the second straight line 38 is set to 0.03 mm is that the interface 17 of the fusion zone 15 includes a portion formed as a result of fusion of the side surface 21 of the tip 16 and a portion formed as a result of fusion of the bottom surface of the tip 16, and, in general, a portion connecting the two portions has a rounded shape. Since the distance between the first perpendicular line 36 and the second straight line 38 is set to 0.03 mm, it is possible to reduce a change in the distance C caused by a change in the curvature of the rounded portion of the interface 17, thereby increasing the accuracy in measurement of the distance C between the discharge surface 20 and a portion of the interface 17 mainly formed as a result of fusion of the bottom surface of the tip 16.

A straight line 40 passes through the second intersection 39 and is parallel to the discharge surface 20. When the length of a second perpendicular line 41 extending from the first intersection 34 to the straight line 40 is represented by B (mm), the spark plug 10 satisfies B/C≥0.4. In other words, the length B of a portion of the tip 16 whose periphery is surrounded by the fusion zone 15 is 0.4 times or more of the distance C between the interface 17 and the discharge surface 20 of the tip 16.

In the case where B/C≥0.4 is satisfied and the ratio X/Y is less than 0.93, it is possible to reduce thermal stress at the interface 17 between the tip 16 and the fusion zone 15. Since cracks which grow along the interface 17 from an end (the first intersection 34) of the interface 17 can be reduced, the joint durability of the tip 16 can be enhanced.

In the case where B/C≥0.4 is satisfied, even when, due to spark discharge, the length-A portion of the tip 16 is eroded or the fusion zone 15 surrounding the length-B portion of the tip 16 is eroded, discharge occurs between the ground electrode 31 and the length-B portion of the tip 16. Therefore, the spark erosion resistance of the tip 16 can be secured. Moreover, in the case where the length-B portion of the tip 16 is surrounded by the fusion zone 15, since the surface area of the length-A portion of the tip 16 exposed to an atmosphere decreases, the resistance to oxidation erosion of the tip 16 at high temperature can be enhanced. Accordingly, the erosion resistance of the tip 16 can be enhanced.

In particular, although Ir, which is the main component of an Ir alloy forming the tip 16, has a high melting point, Ir has characteristics such that, in a high temperature environment, a volatile oxide is produced, and Ir is eroded easily. Since oxidation-induced volatilization of Ir can be mitigated by surrounding the length-B portion of the tip 16 by the fusion zone 15, thereby reducing the surface area of the length-A portion of the tip 16, which is exposed to the atmosphere, the resistant to oxidation erosion of the tip 16 can be enhanced.

Since the erosion resistance of the tip 16 can be enhanced, it becomes unnecessary to increase the volume of the tip 16 so that the tip 16 has a required service life. Accordingly, it is possible to reduce the amount of use of the tip 16 containing a noble metal.

The length A is preferably less than 0.2 mm, more preferably less than 0.12 mm. This is because, even when, due to spark discharge, the length-A portion of the tip 16 is eroded or the fusion zone 15 surrounding the length-B portion of the tip 16 is eroded, the length-B portion mostly remains, and therefore, the erosion resistance of the tip 16 can be enhanced further.

The ratio A/B is preferably less than 1.39, more preferably less than 0.89, because of the following reasons. In the case where the ratio A/B is less than 1.39, cracks which grow along the interface 17 can be reduced further. In the case where the ratio A/B is less than 0.89, even when the length-A portion of the tip 16 is eroded or the fusion zone 15 surrounding the length-B portion of the tip 16 is eroded, the length-B portion mostly remains, and therefore, the erosion resistance of the tip 16 can be enhanced further.

The ratio A/C is preferably less than 0.58, more preferably less than 0.53, because of the following reasons. In the case where the ratio A/C is less than 0.58, cracks which grow along the interface 17 can be reduced further. In the case where the ratio A/C is less than 0.53, even when the length-A portion of the tip 16 is eroded or the fusion zone 15 surrounding the length-B portion of the tip 16 is eroded, the length-B portion mostly remains, and therefore, the erosion resistance of the tip 16 can be enhanced further.

EXAMPLES

The present invention will be described in more detail by way of examples. However, the present invention is not limited to the examples.

A circular columnar tip was placed on a circular columnar base member such that the bottom surface of the tip came into contact with an end surface of the base member, and a laser beam was applied to the tip and the base member so as to form a fusion zone therebetween. There were fabricated samples No. 1 to No. 23 in each of which a tip was joined to a base member through a fusion zone in this manner. The diameter of the end surface of the base member was 0.9 mm, the diameter of the bottom surface of the tip was 0.55 mm, and the height of the tip was 0.36 mm (these dimensions are those before fusion). The material of the base member was NCF600, and the main chemical components of the base member were Ni (>72% by mass), Cr (14 to 17% by mass), and Fe (6 to 10% by mass). The material of the tip was an Ir alloy (Ir-5Pt-0.9Rh-1Ni).

A temperature cycle test was performed by repeating a temperature cycle 1000 times. In the temperature cycle, the tip of each sample was heated by a burner for two minutes such that the temperature of the tip became 900° C., and then each sample was left in the air for one minute so as to cool the tip. Before starting the temperature cycle test, a sample with a thermocouple embedded near the tip was heated by a burner, its temperature was measured, and the combustion condition of the burner was set such that the temperature of the tip reached 900° ° C. in the temperature cycle test.

After the temperature cycle test, a cut surface (see FIG. 2) of each sample, containing the center axis of the tip, was observed under a microscope, and the length A, the length B, the distance C, the length (overall length) D of the interface between the tip and the fusion zone, and the length E of a crack grown from an end of the interface between the tip and the fusion zone along the interface were measured. Since the crack was oxidized, it was possible to distinguish the interface where the joint was maintained and the crack where the interface was broken. The ratio X/Y of the amount (% by mass) of Ni (first component) in the fusion zone (X) to the amount (% by mass) of Ni in the base member (Y) was obtained through analysis under an SEM-EDS. The ratios B/C, A/B, A/C, X/Y, and E/D were calculated. Samples in which the ratio E/D (the ratio of the length of a crack to the overall length of the interface) was 40% or less were judged to be good (G), and samples in which the ratio E/D (the ratio of the length of a crack) was greater than 40% were judged to be poor (P). The results are shown in Table 1.

TABLE 1

| No. | A (mm) | B (mm) | C (mm) | B/C (−) | A/B (−) | A/C (−) | X/Y (−) | Crack (9%) | Judgment |
|---|---|---|---|---|---|---|---|---|---|
| 1 | 0.07 | 0.16 | 0.22 | 0.70 | 0.43 | 0.30 | 0.53 | 0 | G |
| 2 | 0.08 | 0.10 | 0.18 | 0.56 | 0.80 | 0.44 | 0.53 | 0 | |
| 3 | 0.10 | 0.11 | 0.21 | 0.54 | 0.88 | 0.46 | 0.53 | 0 | |
| 4 | 0.11 | 0.10 | 0.21 | 0.47 | 1.11 | 0.53 | 0.53 | 0 | |
| 5 | 0.08 | 0.06 | 0.14 | 0.43 | 1.33 | 0.57 | 0.53 | 0 | |
| 6 | 0.11 | 0.15 | 0.26 | 0.58 | 0.73 | 0.42 | 0.68 | 20 | |
| 7 | 0.10 | 0.13 | 0.23 | 0.55 | 0.82 | 0.45 | 0.89 | 20 | |
| 8 | 0.13 | 0.15 | 0.28 | 0.53 | 0.90 | 0.47 | 0.89 | 0 | |
| 9 | 0.13 | 0.13 | 0.26 | 0.50 | 1.00 | 0.50 | 0.69 | 0 | |
| 10 | 0.16 | 0.13 | 0.29 | 0.45 | 1.24 | 0.55 | 0.69 | 4 | |
| 11 | 0.17 | 0.12 | 0.29 | 0.42 | 1.39 | 0.68 | 0.69 | 0 | |
| 12 | 0.12 | 0.08 | 0.20 | 0.40 | 1.50 | 0.60 | 0.69 | 40 | |
| 13 | 0.12 | 0.04 | 0.16 | 0.25 | 3.00 | 0.75 | 0.69 | 60 | P |
| 14 | 0.16 | 0.10 | 0.26 | 0.38 | 1.60 | 0.62 | 0.87 | 80 | |
| 15 | 0.14 | 0.08 | 0.22 | 0.36 | 1.75 | 0.64 | 0.87 | 80 | |
| 16 | 0.19 | 0.10 | 0.29 | 0.34 | 1.98 | 0.68 | 0.87 | 42 | |
| 17 | 0.20 | 0.09 | 0.29 | 0.31 | 2.21 | 0.69 | 0.87 | 47 | |
| 18 | 0.22 | 0.09 | 0.31 | 0.30 | 2.31 | 0.70 | 0.87 | 85 | |
| 19 | 0.21 | 0.09 | 0.29 | 0.30 | 2.38 | 0.70 | 0.87 | 86 | |
| 20 | 0.14 | 0.04 | 0.18 | 0.22 | 3.60 | 0.78 | 0.87 | 100 | |
| 21 | 0.10 | 0.17 | 0.27 | 0.64 | 0.58 | 0.36 | 0.93 | 100 | |
| 22 | 0.12 | 0.15 | 0.27 | 0.56 | 0.77 | 0.44 | 0.93 | 100 | |
| 23 | 0.13 | 0.13 | 0.27 | 0.48 | 1.02 | 0.51 | 0.93 | 100 | |

As shown in Table 1, in samples Nos. 1 to 12 and 21 to 23, the ratio B/C was equal to or greater than 0.4, and in samples Nos. 13 to 20, the ratio B/C was less than 0.4. Of samples Nos. 1 to 12 and 21 to 23, the samples Nos. 1 to 12 in which the ratio B/C was equal to or greater than 0.4 and the ratio X/Y was less than 0.93 were judged to be good (G) because the ratio of the crack length was equal to or less than 40%. The samples Nos. 21 to 23 in which the ratio B/C was equal to or greater than 0.4 and the ratio X/Y was 0.93 were judged to be poor (P) because the ratio of the crack length was 100%. These results revealed that, when the ratio B/C is equal to or greater than 0.4 and the ratio X/Y is less than 0.93, cracks which grow from the end of the interface of the fusion zone along the interface can be reduced. Accordingly, it is expected that the joint durability of the tip can be enhanced.

In samples Nos. 1 to 13, the ratio X/Y was equal to or less than 0.69. Of samples Nos. 1 to 13, samples Nos. 1 to 12 in which the ratio B/C was equal to or greater than 0.4 were judged to be good (G) because the ratio of crack length was 40% or less. Meanwhile, sample No. 13 in which the ratio B/C was less than 0.4 was judged to be poor (P) because the ratio of crack length was 60%. These results revealed that, when the ratio B/C is equal to or greater than 0.4 and the ratio X/Y is equal to or less than 0.69, cracks which grow from the end of the interface of the fusion zone along the interface can be reduced further.

Although the present invention has been described on the basis of its embodiment. However, the present invention is not limited to the above-described embodiment, and it is surmised that various improvements and modifications are possible within the scope of the present invention.

In the embodiment, the case where the center electrode 13 is the first electrode, and the ground electrode 31 is the second electrode has been described. However, the present invention is not limited to that case. Needless to say, it is possible to consider the ground electrode 31 as the first electrode and consider the center electrode 13 as the second electrode.

In the embodiment, the case where the tip 16 has a circular columnar shape has been described. However, the shape of the tip 16 is not limited to the circular columnar shape. The shape of the tip 16 may be a truncated cone, a quadrangular prism, or a polygonal prism other than the quadrangular prism. In the case where the shape of the tip 16 is a truncated cone, in the sectional view containing the center axis of the tip 16, the side surface 21 of the tip 16 shares the first intersection 34 with the perpendicular line 36. However, except at the intersection 34, the side surface 21 does not overlap with the perpendicular line 36.

In the case where the ground electrode 31 is considered as the first electrode, the shape of the tip 33 may be a circular column, a quadrangular prism, or a polygonal prism other than the quadrangular prism. When the shape of the tip 16 or 33 is changed, the shape of the discharge surface of the tip may be changed to a circular shape, a polygonal shape other than a rectangular shape. Needless to say, it is possible to insert an intermediate member (base member) between the tip 33 and the base member 32 of the ground electrode 31 joined to the metallic shell 28 and/or insert an intermediate member (base member) between the tip 16 and the base member 14 of the center electrode 13. In the case where an intermediate member is present, the fusion zone is formed as a result of fusion of the tip and the intermediate member.

What is claimed is:

1. A spark plug comprising:

a first electrode, comprising:

a base member which contains a first component in the largest amount;

a tip which contains a second component different from the first component in the largest amount, the tip having a discharge surface and a side surface which is continuous with the discharge surface; and a fusion zone which is in contact with the tip and the base member and contains the first component and the second component, the fusion zone having a surface that intersects the tip; and a second electrode disposed with a gap formed between the first electrode and the second electrode, wherein the ratio X/Y of an amount of the first component in the fusion zone (X) to an amount of the first component in the base member (Y) is less than 0.93, wherein, in a cross section perpendicular to the discharge surface:

a first perpendicular line extends to a first straight line containing the discharge surface from a first intersection between the side surface of the tip and the surface of the fusion zone; and a second straight line extends perpendicularly to the first straight line and passes through a point on the first straight line, the point being 0.03 mm away from the first perpendicular line in a direction away from the surface of the fusion zone, the second straight line intersecting an interface between the tip and the fusion zone at a second intersection, and wherein, when the distance between the second intersection and the point is represented by C (mm) and the length of a second perpendicular line extending from the first intersection to a straight line passing through the second intersection and being parallel to the discharge surface is represented by B (mm), the ratio of the length B to the distance C is equal to or greater than 0.4.

2. A spark plug according to claim 1, wherein the ratio X/Y is equal to or less than 0.69.

3. A spark plug according to claim 1, wherein the length A of the first perpendicular line is greater than 0 mm and less than 0.2 mm.

4. A spark plug according to claim 1, wherein the length A of the first perpendicular line is greater than 0 mm and less than 0.12 mm.

5. A spark plug according to claim 1, wherein the ratio of the length A of the first perpendicular line to the distance C is less than 0.53.

6. A spark plug according to claim 1, wherein the ratio of the length A of the first perpendicular line to the length B is less than 0.89.

7. A spark plug according to claim 1, wherein the first component is Ni.

8. A spark plug according to claim 1, wherein the second component is Ir.

* * * * *